(12) United States Patent
Feng et al.

(10) Patent No.: US 10,170,975 B1
(45) Date of Patent: Jan. 1, 2019

(54) AC LINE DETECTION AND X CAPACITOR DISCHARGE USING A SINGLE TERMINAL

(71) Applicant: DIALOG SEMICONDUCTOR INC., Campbell, CA (US)

(72) Inventors: Guang Feng, Campbell, CA (US); Qifeng Shi, Campbell, CA (US); Jiang Yu, Campbell, CA (US); Qiu Sha, Campbell, CA (US); Yong Xiong Lin, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/906,959

(22) Filed: Feb. 27, 2018

(51) Int. Cl.
| H02M 1/12 | (2006.01) |
| H02J 3/24 | (2006.01) |
| H02M 5/293 | (2006.01) |
| H02M 5/12 | (2006.01) |

(52) U.S. Cl.
CPC .............. *H02M 1/126* (2013.01); *H02J 3/24* (2013.01); *H02M 5/12* (2013.01); *H02M 5/293* (2013.01)

(58) Field of Classification Search
CPC ........ H02M 1/126; H02M 5/12; H02M 5/293; H02M 2001/0009; H02J 3/24
See application file for complete search history.

(56) References Cited

U.S. PATENT DOCUMENTS

| 9,837,917 | B1* | 12/2017 | Furtner | H02M 3/33523 |
| 2010/0309694 | A1* | 12/2010 | Huang | H02M 1/126 363/49 |
| 2011/0249476 | A1* | 10/2011 | Chen | H02H 1/0007 363/52 |
| 2011/0305051 | A1* | 12/2011 | Yang | H02M 1/36 363/49 |
| 2012/0105016 | A1* | 5/2012 | Moon | H02M 1/36 320/166 |
| 2012/0112564 | A1* | 5/2012 | Wu | H02M 1/44 307/326 |
| 2012/0201055 | A1* | 8/2012 | Moon | H02M 1/4258 363/21.02 |
| 2012/0313616 | A1* | 12/2012 | Lee | H02M 1/126 323/312 |
| 2013/0033236 | A1* | 2/2013 | Li | H02M 7/219 320/166 |
| 2013/0049706 | A1* | 2/2013 | Huang | H02M 1/32 320/166 |
| 2013/0076315 | A1* | 3/2013 | Liu | H02M 1/32 320/166 |
| 2013/0148998 | A1* | 6/2013 | Shimura | G03G 15/80 399/88 |
| 2013/0235622 | A1* | 9/2013 | Masuda | H02M 3/33507 363/21.12 |
| 2013/0258722 | A1* | 10/2013 | Wang | H02M 1/4258 363/21.12 |

(Continued)

*Primary Examiner* — Yusef A Ahmed
(74) *Attorney, Agent, or Firm* — Haynes and Boone, LLP

(57) ABSTRACT

A controller for a switching power converter is provided with a single detection pin through which the controller monitors whether the switching power converter is connected to an AC mains. Should a voltage for the detection pin indicate that the switching power converter is disconnected from the AC mains, the controller asserts the detection pin voltage to trigger a bleeder circuit to discharge an X class capacitor.

19 Claims, 4 Drawing Sheets

(56) References Cited

U.S. PATENT DOCUMENTS

| | | | | |
|---|---|---|---|---|
| 2013/0335038 A1* | 12/2013 | Lee | ............... | H02M 1/126 |
| | | | | 320/166 |
| 2014/0036561 A1* | 2/2014 | Sakurai | ............ | H02M 7/217 |
| | | | | 363/126 |
| 2015/0062974 A1* | 3/2015 | Lund | ............ | G01R 19/175 |
| | | | | 363/21.04 |
| 2015/0160287 A1* | 6/2015 | Huang | ............ | G01R 31/2836 |
| | | | | 324/537 |
| 2015/0233979 A1* | 8/2015 | Barrenscheen | .. | G01R 19/16547 |
| | | | | 324/120 |
| 2016/0226371 A1* | 8/2016 | Tsou | ............... | H02M 1/32 |
| 2016/0241135 A1* | 8/2016 | Zhao | ............... | H02M 1/44 |
| 2017/0187217 A1* | 6/2017 | Gong | ............ | G01R 19/155 |

* cited by examiner

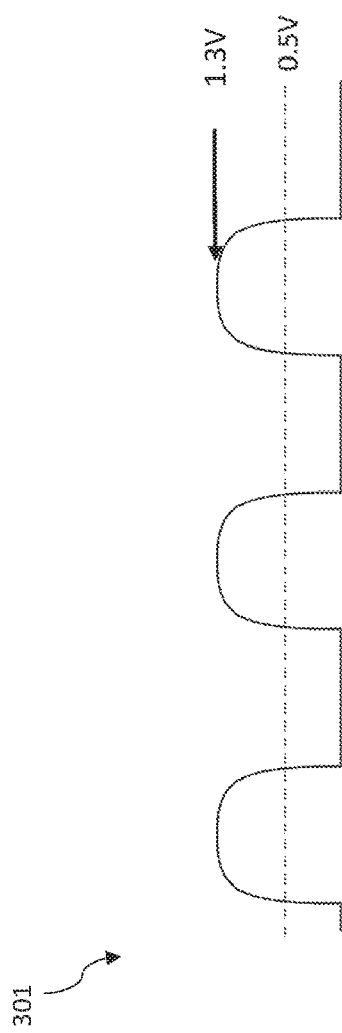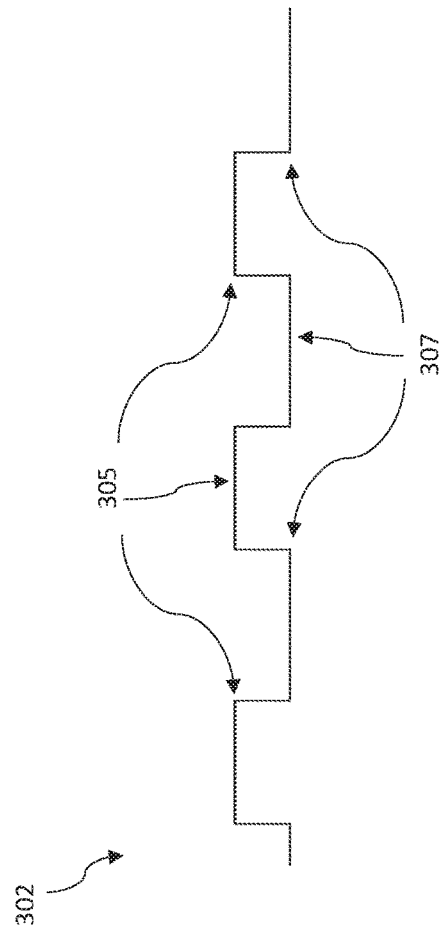

AC LINE DETECTION AND X CAPACITOR DISCHARGE USING A SINGLE TERMINAL

TECHNICAL FIELD

This application relates to switching power converter controllers, and more particularly to switching power converter controllers with AC detection and filtering capacitor discharge control.

BACKGROUND

The high efficiency of switching power converters has led to their near-universal adaption to power and charge mobile devices. Since a switching power converter (power adapter) switches at frequencies up to one hundred kilohertz or even higher, the power adapter may drive high frequency noise onto the AC mains. To prevent this undesirable noise from affecting the AC mains, power adapters typically include a high frequency filtering capacitor (denoted as an X class capacitor or X capacitor) that is connected across the AC line terminal (AC live) and the AC neutral terminal. The voltage on the AC line terminal will oscillate according to the AC mains' oscillation frequency (e.g., 60 Hz in the United States of America) with respect to the AC neutral terminal voltage. Depending upon when a user unplugs the power adapter from the AC mains with respect to this AC oscillation, the X capacitor may thus store a relatively large positive or negative voltage. It is thus conventional for a power adapter to include an AC detection circuit that detects whether the power adapter is connected to the AC mains. Should the AC detection circuit detect that the power adapter is disconnected from the AC mains, the power adapter triggers a bleeder circuit such as a switch to discharge the X capacitor.

But conventional AC detection and X capacitor discharge is cumbersome and increases manufacturing costs. For example, a conventional flyback converter 100 is shown in FIG. 1. An X capacitor (X CAP) connects across an AC line terminal 103 and an AC neutral terminal 105. Should these terminals be connected to the AC mains, the X capacitor will prevent switching noise from affecting the AC mains. A diode bridge rectifies an AC input voltage, V_IN (AC), from the AC mains to output a rectified voltage (V_BULK) that is stored across an input capacitor $C_{BULK}$. A primary-side controller U1 regulates an output V_OUT on the secondary side of a transformer T by modulating the ON and OFF cycles of power transistor S1 connected to a primary winding of the transformer.

Controller U1 detects whether terminals 103 and 105 are connected to the AC mains through an AC detection circuit that drives an AC detection signal to an AC detection terminal or pin for controller U1. In flyback converter 100, the AC detection circuit includes a pair of diodes that couple from terminals 103 and 105 to the AC detection terminal. Controller U1 is configured to detect whether a voltage of the AC detection pin is oscillating according to the AC oscillation for the AC input voltage. Should controller U1 detect that the AC detection pin voltage is not oscillating, it discharges the X capacitor by asserting a voltage of an X capacitor discharge terminal or pin (X CAP Discharge) to close an X capacitor discharge switch 109. X capacitor discharge switch 109 couples across terminals 103 and 105 so that the X capacitor is discharged when X capacitor discharge switch 109 is closed. Controller U1 thus requires two separate pins to accommodate the AC detection and X capacitor discharge process. Each additional pin raises the manufacturing cost for controller U1.

Accordingly, there is a need in the art for improved AC detection and filtering capacitor discharge control for switching power converters having reduced manufacturing costs.

SUMMARY

To address the need in the art for an improved AC detection and X capacitor discharge control with lower manufacturing costs, a switching power converter controller is provided that uses a single pin to detect whether the switching power converter is connected to an AC mains and to also control a discharge of the X capacitor responsive to a detection that the switching power converter is not connected to the AC mains. Despite the AC detection and X capacitor discharge being shared on a common pin, the controller accurately detects the AC connection and robustly discharges the X capacitor accordingly. These advantageous features may be better appreciated through a consideration of the following detailed description.

BRIEF DESCRIPTION OF THE DRAWINGS

FIGS. 3A and 3B illustrate waveforms for a switching power converter configured for a single terminal AC detection and filtering capacitor discharge control in accordance with an embodiment of the disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

The following discussion will be directed to a flyback converter embodiment. But it will be appreciated that the single pin AC detection and X capacitor discharge control disclosed herein may be implemented in other type of switching power converters such as a buck converter, a boost converter, or a buck-boost converter. An example flyback converter 200 having a controller U2 configured for a single pin AC detection and X capacitor discharge is shown in FIG. 2. As discussed with regard to FIG. 1, flyback converter 200 includes a power switch transistor S1 in series with a primary winding of a transformer T. Controller U2 controls the cycling of power switch transistor S1 to regulate an output voltage (for illustration clarity, the secondary side of transformer T is not shown in FIG. 2) through a gate pin or terminal (GATE). Additional components of flyback converter 200 such as a sense resistor are not shown for illustration clarity. As illustrated, power switch transistor S1 is an NMOS metal-oxide semiconductor field-effect transistor (MOSFET) device but it will be appreciated that power switch transistor S1 may comprise other types of switch transistors such as a bipolar junction transistor (BJT) in alternative embodiments.

Figure 1:
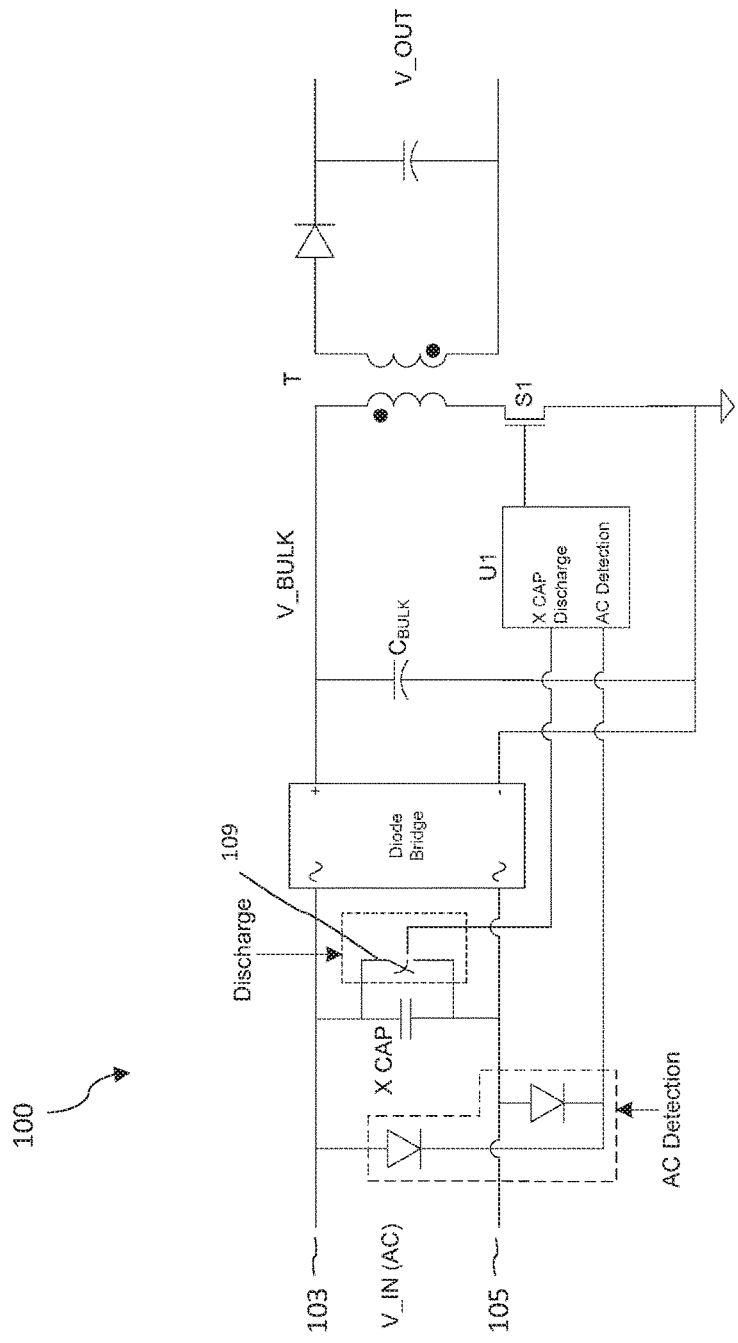
FIG. 1 is a diagram for a conventional switching power converter configured for a multiple terminal AC detection and filtering capacitor discharge control in accordance with an embodiment of the disclosure.
Figure 2:
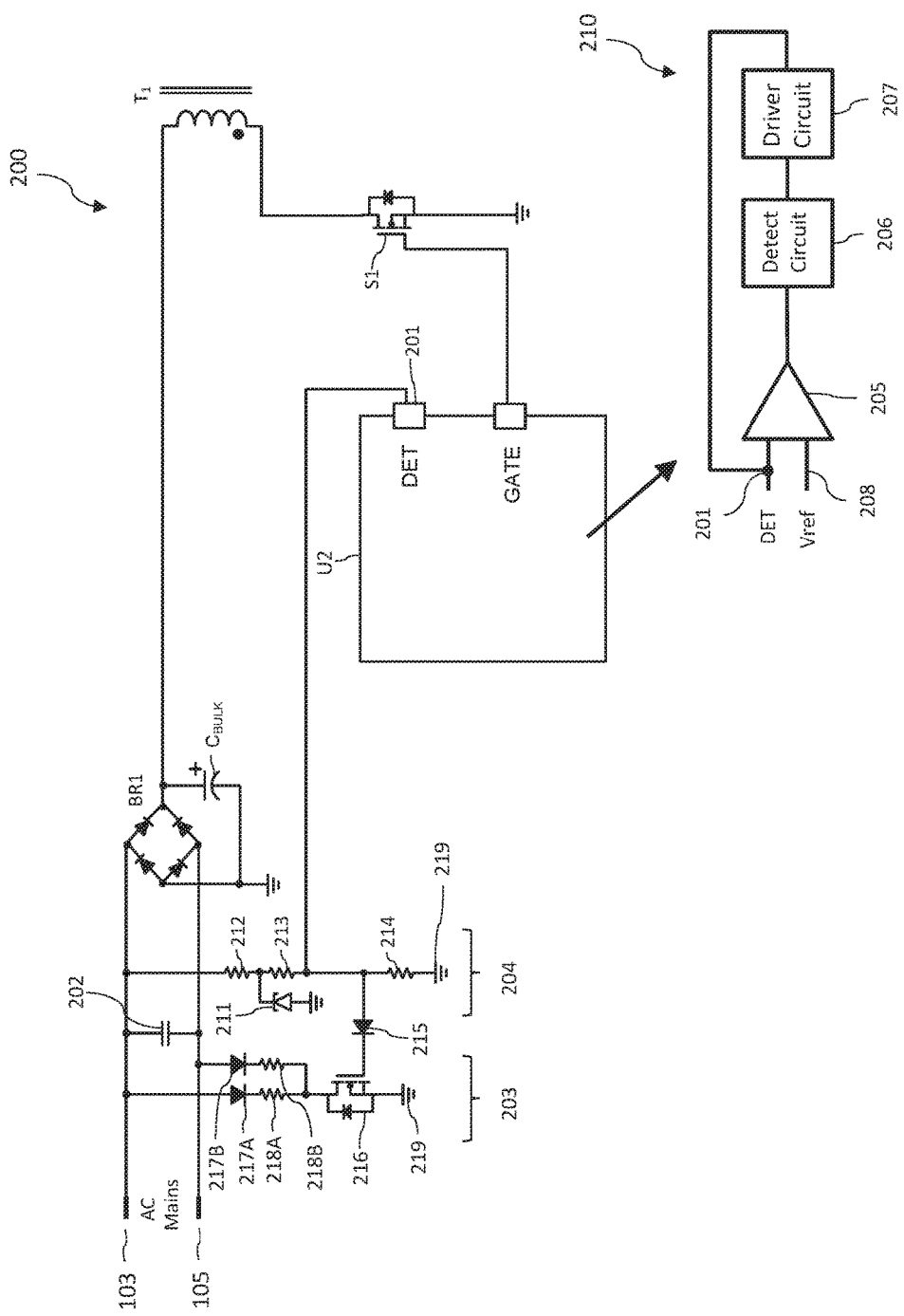
FIG. 2 is a diagram for a switching power converter configured for a single terminal AC detection and filtering capacitor discharge control in accordance with an embodiment of the disclosure.

As also discussed with regard to FIG. 1, flyback converter 200 includes an X capacitor connected across AC line terminal 103 and an AC neutral terminal 105. Similarly, these terminals drive a diode bridge BR1 to produce a rectified input voltage smoothed by bulk capacitor $C_{BULK}$.

A single detection pin 201 for controller U2 monitors whether terminals 103 and 105 are connected through an AC mains through an AC detection circuit 204. As discussed further herein, controller U2 is configured to monitor a voltage for detection pin 201 as driven through AC detection circuit 204. Should controller U2 determine that the detection pin voltage is not oscillating as it would should terminals 103 and 105 be connected to the AC mains, controller U2 then asserts the detection pin voltage to discharge the X capacitor by switching on a switch transistor 216 in an X capacitor discharge circuit 203. AC detection circuit 204 will now be discussed in more detail followed by a discussion of X capacitor bleeder circuit 203.

Since AC detection circuit 204 drives just single detection pin 201 in controller U2, AC detection circuit 204 connects to just one of terminals 103 and 105. The following discussion will be directed to an embodiment in which AC detection circuit 204 connects to AC line terminal 103 but it will be appreciated that AC detection circuit 204 could instead connect to AC neutral terminal 105 in alternative embodiments. AC detection circuit 204 includes a voltage divider formed by a serial arrangement of a resistor 212, a resistor 213, and a resistor 214. Resistor 212 has a first terminal that connects to AC line terminal 103 and a second terminal that connects to resistor 213. In turn, resistor 213 connects to ground through resistor 214. The second terminal of resistor 212 also connects to ground through a Zener diode 211. Depending upon the AC oscillation of the voltage for AC line terminal 103, Zener diode 211 thus clamps the voltage of the second terminal for resistor 213 to either its reverse breakdown voltage (e.g., approximately 5.1 V) or to its forward bias breakdown voltage of approximately –0.7 V. In particular, as the voltage of the AC line terminal 103 swings high in its AC oscillation, Zener diode 211 clamps the voltage for the second terminal of resistor 213 at 5.1 V. Conversely, as the voltage of the AC line terminal 103 swings below –0.7 V, Zener diode 211 clamps the voltage for this second terminal at –0.7 V. It will be appreciated that other values of breakdown voltages may be used for alternative Zener diode embodiments.

Since detection terminal 201 connects to a node between resistors 213 and 214, the clamped voltage for the second terminal of resistor 213 is further divided down to drive detection terminal 201. Due to this clamping and voltage division, the detection terminal voltage for controller U2 is not exposed to high voltages such that relatively thin gate-oxide thicknesses may be used in a comparator 205 within controller U2. Should terminals 103 and 105 be connected to the AC mains, the resulting voltage waveform at detection terminal 201 then oscillates as shown in FIG. 3A. In this embodiment, the voltage division and clamping for AC detection circuit 204 is such that the detection terminal voltage is clamped at a maximum voltage of approximately 1.3 V when the voltage of AC line terminal 103 swings above the reverse breakdown voltage for Zener diode 211. Similarly, the detection terminal voltage is clamped at a minimum voltage of approximately 0 V (actually slightly negative) when the voltage of AC line terminal 103 swings below the forward breakdown voltage for Zener diode 211. The detection terminal voltage will thus oscillate between these maximum and minimum clamped voltages at the AC oscillation frequency for the AC mains. Comparator 205 detects this oscillation with respect to a reference voltage such as 0.5 V that is approximately half way between these maximum and minimum voltages.

A voltage waveform for an output of comparator 205 while flyback converter 200 is connected to the AC mains is shown in FIG. 3B. The comparator output swings to a binary high (binary one) state 305 such as represented by a power supply voltage while the detection terminal voltage is above the reference voltage. Conversely, the comparator output signal is discharged to a binary low (binary zero) state 307 such as ground while the detection terminal voltage is below the reference voltage. While flyback converter 200 is plugged into the AC mains, the comparator output signal will thus oscillate between binary high state 305 and binary low state 307 at the AC oscillation frequency. For example, in the United States of America, the AC oscillation period is approximately 16.7 milliseconds. In each AC oscillation period, the binary high state 305 would be held for one half of this period followed by the binary low state 307 being held for one half of the AC oscillation period.

Referring again to FIG. 2, controller U2 may thus further include a detection circuit 206 such as a counter. In a counter embodiment, the counter would count the amount of time that the comparator output is held in either the binary high state 305 or the binary low state 307. The counter would then be reset at every transition between states 305 and 307. Should the counter indicate that state 305 or 307 is held for a relatively long amount of time compared to the AC oscillation period such as greater than one-half (or more) of the AC oscillation period, detection circuit 206 triggers a driver circuit 206 to assert the detection terminal voltage. For example, in an embodiment for the US market, detection circuit 206 may trigger driver circuit 207 if either of states 305 or 307 is held for longer than 100 milliseconds. It will be appreciated, however, that other thresholds may be used by detection circuit 206. When flyback converter 200 is disconnected from the AC mains, the detection terminal voltage floats generally at whatever voltage state it was in prior to the AC mains disconnection. It doesn't matter whether the detection terminal voltage floats above the reference voltage or below because detection circuit 206 will detect that lack of toggling for the comparator output signal accordingly.

The assertion of the detection terminal voltage to a sufficiently high level (for example 5 V) by driver circuit 207 switches on switch transistor 216. To prevent switch transistor 216 from switching on while flyback converter 200 is connected to the AC mains, detection terminal (or pin) 201 connects to the gate of switch transistor 216 through a diode 215. Thus when the detection terminal voltage is clamped at its maximum voltage such as the 1.3 V discussed with regard to FIG. 3A, the forward bias voltage drop across diode 215 prevents the gate voltage for switch transistor 216 from rising above its threshold voltage such that X capacitor 202 is not discharged. In this fashion, X capacitor 202 can continue to protect the AC mains from noise during normal operation.

Bleeder circuit 203 further includes series diode/resistor pairs 217A/218A and 217B/218B. Bleeder circuit 203 is coupled to X capacitor 202 to discharge X capacitor 202 when pulsed DC voltage signal, as provided by detection pin 201, turns on transistor switch 216. Discharging X capacitor 202 is achieved by shorting AC line terminal 103 and AC neutral terminal 105 to ground. Transistor switch 216 may be a field-effect transistor (FET) device (e.g., a metal-oxide semiconductor field-effect transistor (MOSFET) device), a bipolar junction transistor (BJT) device, or other appropriate transistor switch. In some embodiments, transistor switch 216 is an n-channel MOSFET. Diode 215 is connected between a gate terminal of transistor switch 216 at a cathode end and detection pin 201 at an anode end. A source terminal of transistor switch 216 is connected to ground 219. A drain terminal of transistor switch 216 is connected to resistors 218A and 218B. Resistors 218 A/218B limit a discharge current during the discharge period to protect transistor switch 216 from overstress.

A diode 217A is connected between resistor 218A at a cathode end and AC line terminal 103 at an anode end. A diode 217B is connected between resistor 218B at a cathode end and AC neutral terminal 105 at an anode end. In this regard, filtering capacitor 202 is shorted to ground 219 and discharges when bleeder circuit 203 is turned on by the pulsing high of the detection terminal voltage.

Figure 4:
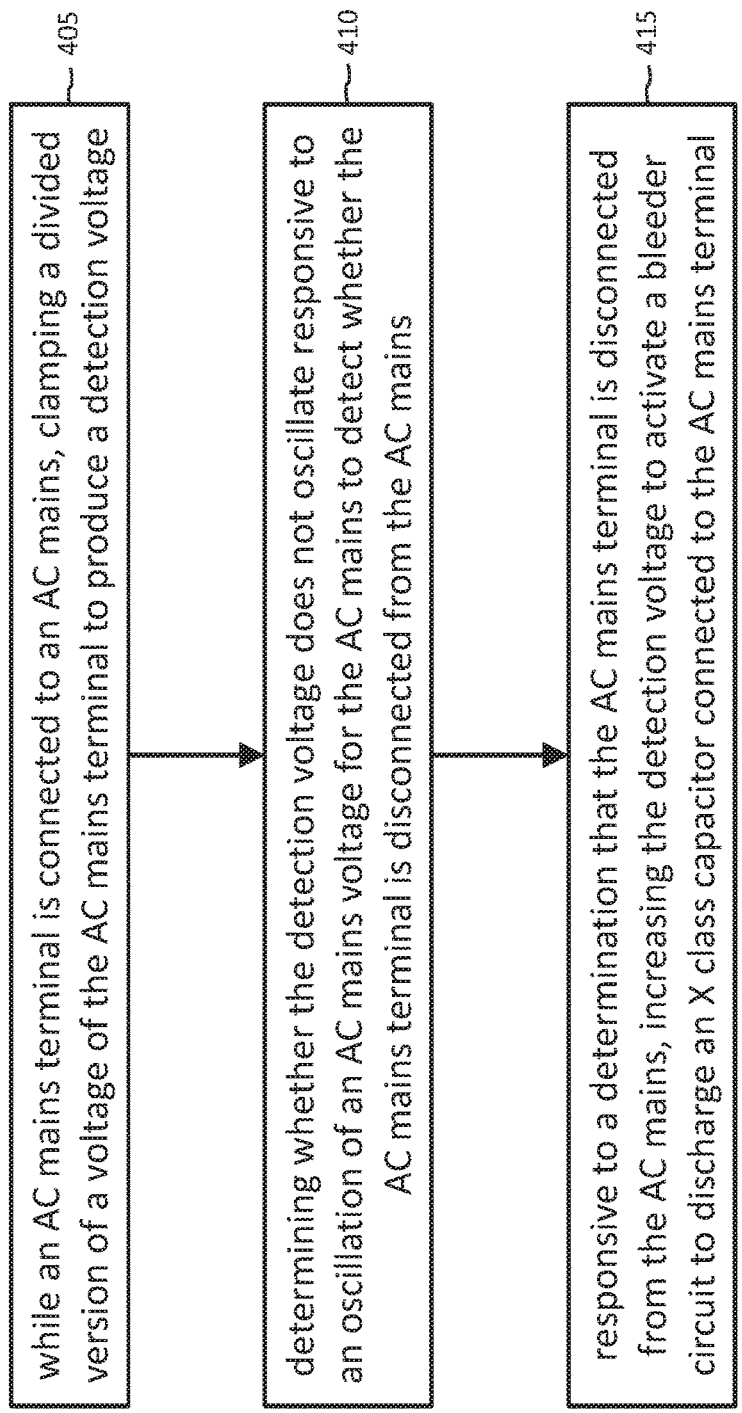
FIG. 4 illustrates a method of operation for a single terminal AC detection and filtering capacitor discharge control in accordance with an embodiment of the disclosure.

A method of operation for the AC detection and X capacitor discharge process will now be discussed with reference to a flowchart shown in FIG. 4. The method includes an act 405 that occurs while an AC mains terminal is connected to an AC mains. In particular, act 405 includes clamping a divided version of a voltage of the AC mains terminal to produce a detection voltage. The action of AC detection circuit 204 to produce the detection terminal voltage is an example of act 405. In addition, the method includes an act 410 of determining whether the detection voltage does not oscillate responsive to an oscillation of an AC mains voltage for the AC mains to detect whether the AC mains terminal is disconnected from the AC mains. The detection by detection circuit 206 that the comparator output signal is being held either high or low for greater than the threshold period is an example of act 410. Finally, the method includes an act 415 that is responsive to a determination that the AC mains terminal is disconnected from the AC mains and comprises increasing the detection voltage to activate a bleeder circuit to discharge an X class capacitor connected to the AC mains terminal. The increase in the detection terminal voltage by driver circuit 207 to switch on switch transistor 216 in bleeder circuit 203 to discharge X capacitor 202 is an example of act 415.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switching power converter controller for a switching power converter, comprising:
 a detection pin for receiving a clamped and divided version of an AC mains terminal voltage from an AC mains terminal;
 a comparator configured to compare a detection pin voltage of the detection pin to a reference voltage to drive a comparator output signal into a binary high state or a binary low state responsive to whether the detection pin voltage is greater or lower than the reference voltage;
 a detection circuit configured to detect whether the AC mains terminal is disconnected from an AC mains through a determination of whether the comparator output signal is in the binary high state for a threshold period and of whether the comparator output signal is in the binary low state for the threshold period, wherein the threshold period is greater than one-half of a period for an oscillation of the AC mains terminal voltage; and
 a driver configured to increase the detection pin voltage to switch on a bleeder circuit to discharge an X class capacitor responsive to a detection by the detection circuit that the AC mains terminal is disconnected from the AC mains.

2. The switching power converter controller of claim 1, wherein the detection circuit comprises a counter configured to measure whether the comparator output signal is in the binary high state or in the binary low state for a time that exceeds the threshold period.

3. The switching power converter controller of claim 1, wherein the threshold period is approximately one hundred milliseconds.

4. The switching power converter controller of claim 1, further comprising a voltage divider coupled to the detection pin and configured to divide the AC mains terminal voltage into a divided voltage.

5. The switching power converter controller of claim 4, wherein the bleeder circuit comprises a metal-oxide semiconductor field-effect transistor coupled across the X class capacitor.

6. The switching power converter controller of claim 4, further comprising a Zener diode coupled to the detection pin, wherein the voltage clamp circuit clamps the divided voltage to produce the clamped and divided version of the AC mains terminal voltage.

7. The switching power converter controller of claim 1, wherein the reference voltage is approximately 0.5 V.

8. A method for a switching power converter, comprising:
 while an AC mains terminal is connected to an AC mains, clamping a divided version of an AC mains voltage to produce a detection voltage;
 determining whether the detection voltage does not oscillate responsive to an oscillation of the AC mains voltage for the AC mains to detect whether the AC mains terminal is disconnected from the AC mains;
 responsive to a determination that the AC mains terminal is disconnected from the AC mains, increasing the detection voltage to activate a bleeder circuit to discharge an X class capacitor connected to the AC mains terminal;
 comparing the detection voltage in a comparator to a reference voltage to provide a comparator output signal; and
 determining whether the comparator output signal is maintained in a binary one state for a time that is greater than a threshold period, wherein the threshold period is greater than an oscillation period for the oscillation of the AC mains voltage.

9. The method of claim 8, wherein determining whether the detection voltage does not oscillate responsive to the oscillation of the AC mains voltage further comprises determining whether the comparator output signal is maintained in a binary zero state for the time that is greater than the threshold period.

10. The method of claim 9, wherein determining whether the comparator output signal is maintained in the binary zero state for the time that is greater than the threshold period comprises determining whether the comparator output signal equals ground for the time that is greater than the threshold period.

11. The method of claim 10, wherein activating the bleeder circuit comprises switching on a metal-oxide semiconductor field-effect transistor responsive to the increase of the detection voltage.

12. The method of claim 8, wherein determining whether the comparator output signal is maintained in the binary one state for the time that is greater than the threshold period comprises determining whether the comparator output signal equals a power supply voltage for the time that is greater than the threshold period.

13. The method of claim 12, wherein determining whether the comparator output signal equals the power supply voltage for the time that is greater than the threshold period comprises:
   counting a time period the comparator output signal equals the power supply voltage; and
   determining whether the time period exceeds the threshold period.

14. A switching power converter, comprising:
   an X class capacitor connected between an AC line terminal and an AC neutral terminal;
   a voltage divider connected to the AC line terminal and configured to divide a voltage of the AC line terminal into a divided voltage;
   a Zener diode configured to clamp the divided voltage into a detection pin voltage;
   a bleeder circuit configured to discharge the X class X capacitor responsive to an increase of the detection pin voltage; and
   a controller including:
      a detection pin for receiving the detection pin voltage;
      a comparator configured to compare the detection pin voltage to a reference voltage to produce a comparator output signal,
      a detection circuit configured to determine whether the comparator output signal is in a binary high state for a threshold period or in a binary low state for the threshold period to detect whether the switching power converter is disconnected from an AC mains; and
      a driver configured to increase the detection pin voltage responsive to a detection by the detection circuit that the switching power converter is disconnected from the AC mains.

15. The switching power converter of claim 14, wherein the bleeder circuit includes a switch transistor coupled across the X class capacitor and also includes a diode coupled between a gate of the switch transistor and the detection pin.

16. The switching power converter of claim 15, wherein the switch transistor comprises a metal-oxide semiconductor field-effect transistor.

17. The switching power converter of claim 15, wherein the bleeder circuit further comprises a pair of resistors for coupling the switch transistor across the X class capacitor.

18. The switching power converter of claim 14, wherein the switching power converter comprises a flyback converter.

19. The switching power converter of claim 14, wherein the voltage divider comprises a serial arrangement of at least three resistors.

* * * * *

UNITED STATES PATENT AND TRADEMARK OFFICE
CERTIFICATE OF CORRECTION

| | | |
|---|---|---|
| PATENT NO. | : 10,170,975 B1 | |
| APPLICATION NO. | : 15/906959 | |
| DATED | : January 1, 2019 | |
| INVENTOR(S) | : Guang Feng et al. | |

It is certified that error appears in the above-identified patent and that said Letters Patent is hereby corrected as shown below:

In the Claims

Column 7, Line 30, Claim 14 change "X class X" to --X class--.

Signed and Sealed this
Twenty-third Day of April, 2019

Andrei Iancu
*Director of the United States Patent and Trademark Office*